United States Patent [19]

Ueda

[11] Patent Number: 4,935,879
[45] Date of Patent: Jun. 19, 1990

[54] TEXTURE MAPPING APPARATUS AND METHOD

[75] Inventor: Tomoaki Ueda, Kyoto, Japan

[73] Assignee: Daikin Industries, Ltd., Osaka, Japan

[21] Appl. No.: 228,971

[22] Filed: Aug. 5, 1988

[30] Foreign Application Priority Data

Aug. 5, 1987 [JP] Japan ................. 62-197131

[51] Int. Cl.$^5$ .................... G09B 9/08; G09G 1/16
[52] U.S. Cl. .................... 364/522; 340/723; 382/54; 382/28
[58] Field of Search .................... 364/518–522; 340/723, 727, 747, 798, 799; 382/54, 1, 28

[56] References Cited

U.S. PATENT DOCUMENTS

| | | | |
|---|---|---|---|
| 4,475,104 | 10/1984 | Shen | 364/521 |
| 4,609,917 | 9/1986 | Shen | 340/729 |
| 4,625,290 | 11/1986 | White | 364/522 |
| 4,714,920 | 12/1987 | Andernach et al. | 340/723 |
| 4,715,005 | 12/1987 | Heartz | 364/521 |
| 4,791,580 | 12/1988 | Sherrill et al. | 364/521 |

OTHER PUBLICATIONS

English translation of "What is the Texture Mapping (1)", Collection of Lectures and Theses [III] by Takeshi Shibamoto et al, Association of Data Processing, published Sep. 9, 1985, Japanese language copy of original article by Shibamoto et al.

*Primary Examiner*—Gary V. Harkcom
*Assistant Examiner*—H. R. Herndon
*Attorney, Agent, or Firm*—Beveridge, DeGrandi & Weilacher

[57] ABSTRACT

A texture mapping apparatus for the real-time display of a figure in which an animated image has been mapped. The apparatus includes a device which generates 2D (2 dimensional) source coordinates data which provide a source for texture mapping data corresponding to 3D (3 dimensional) destination coordinates data which in turn provide destinations for texture mapping data. A first dual port memory stores the 2D source coordinates data, and a second dual port memory stores animated image data. The 2D source coordinates data are read out from the first dual port memory to the second dual port memory as destination addresses. Color data read out from the second dual port memory are supplied to a display unit.

10 Claims, 11 Drawing Sheets

DUAL PORT MEMORY 2

DUAL PORT MEMORY 2

DUAL PORT MEMORY 2

DUAL PORT MEMORY 4

CRT 6

TEXTURE PLANE COORDINATES DATA

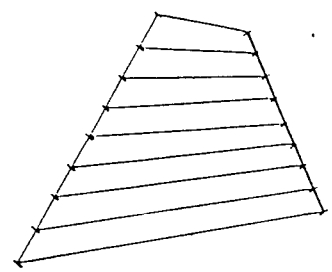
FIG.12A
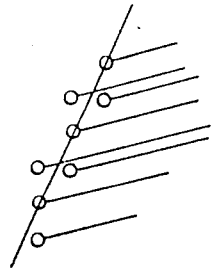
FIG.12B
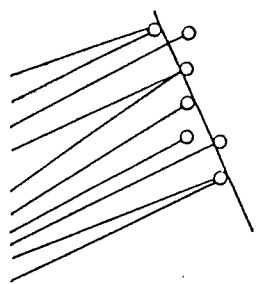
FIG.12C
FIG.13
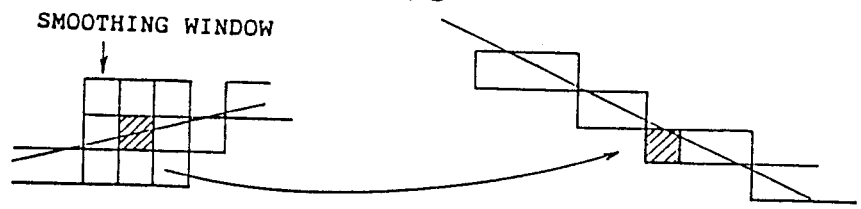
SMOOTHING WINDOW

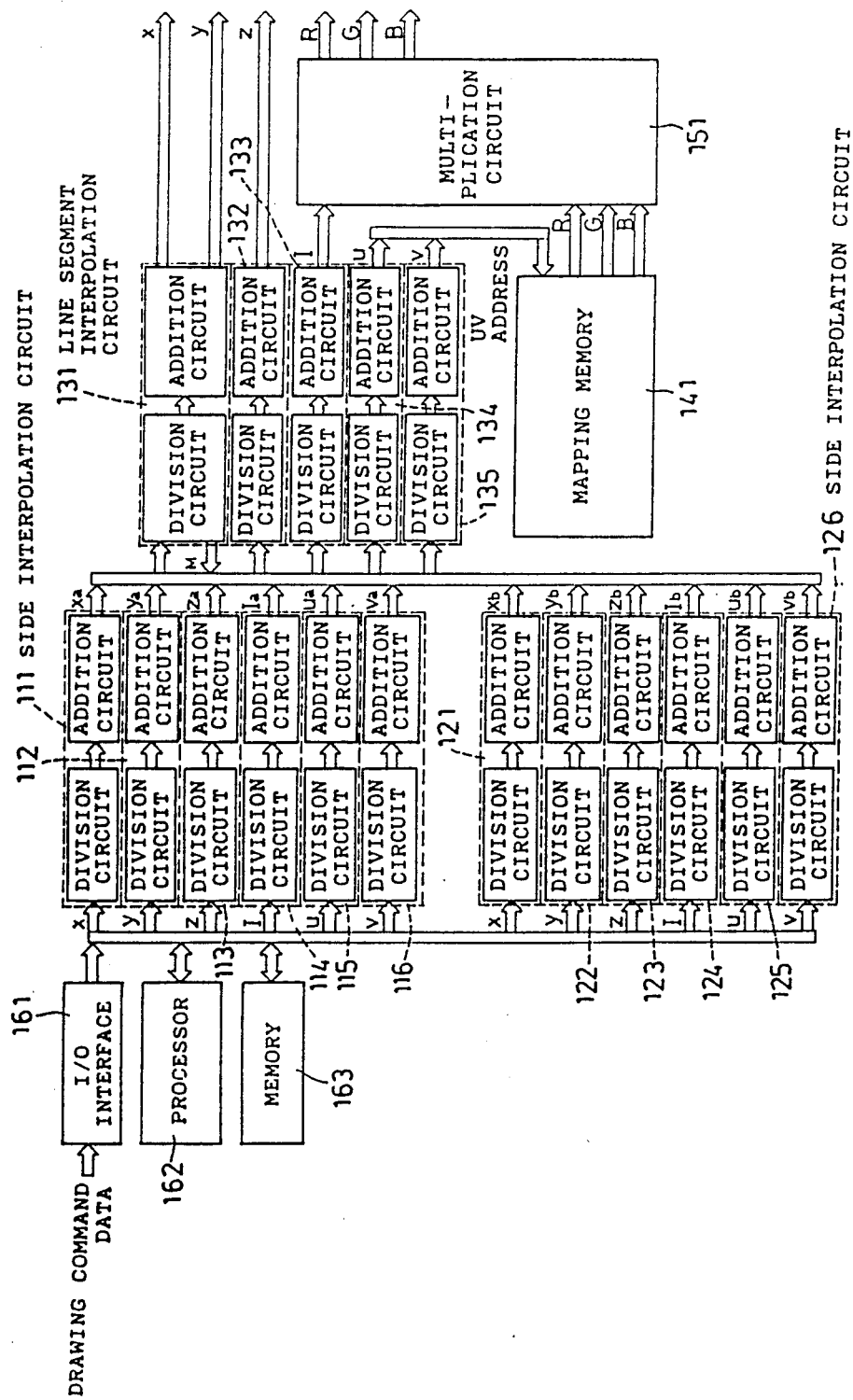

TEXTURE MAPPING APPARATUS AND METHOD

BACKGROUND OF THE INVENTION

The present invention relates to a texture mapping apparatus and a texture mapping method for projecting pixel image data in a desired area of a texture plane on figure data in a desired area of a display plane.

There has been an increased demand for design or image effects made by mapping a desired area of figure data previously supplied from an image input device, or figure data drawn by a figure drawing device, onto a surface of a chosen solid figure. To satisfy this demand, texture mapping apparatus have been provided for projecting and displaying a desired two-dimensional (hereinafter referred to as 2D) figure on a desired three-dimensional (hereinafter referred to as 3D) figure.

There is known a texture mapping apparatus in which a 2D texture original figure is divided into line segments in the scan line direction, and the line segments thus obtained are subjected to an inverse perspective transformation for each pixel while the line segments are being scanned on the display plane in the scan line direction. Such texture mapping techniques are discussed in "What is the Texture Mapping (1)", in the Collection of Lectures and Theses [III] by Takeshi 8HIBAMOTO and Makoto KOBAYASHI, Association of Data Processing, Published in Sept. 9, 1985.

In the texture mapping apparatus arranged as above-mentioned, it is required to carry out a matrix operation for each pixel; this creates a problem of slow processing speed. In particular, when an animation image, e.g., a video image is sued as a texture original figure, such texture mapping apparatus cannot execute the texture mapping processing in real time after the image is changed. This prevents use of an animation image as a texture original figure.

Further, there are instances where accurate mapping cannot be achieved, depending upon the combination of unit polygons forming a texture original figure with unit polygons forming a figure on the display plane. This results in deterioration of the quality of the figure data displayed on the display plane.

Further, there are instances where polygons constituting a figure on the display plane present a butterfly plane. It is therefore required to judge previously, whether or not three apexes of a polygon exist on the same plane on which another apex exists to thereby identify whether or not the polygon presents a butterfly plane. This not only increases the required processing time, but also reduces the accuracy of texture mapping.

To increase the texture mapping processing speed, as well as to improve the display quality of figure data for which texture mapping processing has been executed, the inventor has proposed a texture mapping apparatus as shown in FIG. 14 and which is disclosed in U.S. patent application Ser. No. 07/100,677, filed Sept. 24, 1987 which has been abandoned in favor of 07/410,017 filed September 1989. With respect to FIG. 14, the latter texture mapping apparatus comprises:

two pairs of side interpolation circuits 111, 112, 113, 114, 115, 116, 121, 122, 123, 124, 125, 126 for linearly interpolating two sides of a polygon on a display plane and two sides of a polygon on a texture plane synchronously;

line segment interpolation circuits 131, 132, 133, 134, 135 for synchronously linearly interpolating the line segments defined by point data obtained by the two pairs of side interpolation circuits 111, 112, 113, 114, 115, 116, 121, 122, 123, 124, 125, 126;

a mapping memory 141 for receiving, as reading addresses, 2D source coordinates data for texture mapping data u, v, supplied from the line segment interpolation circuits 134, 135;

a multiplication circuit 151 for receiving color code data (R, G and B) read from the mapping memory 141, and brightness data I supplied from the line segment interpolation circuit 133 to execute a shading correction operation, etc.;

an I/O interface 161 for fetching drawing command data;

a processor 162 for executing side selection processing and the like; and a memory 163.

In the texture mapping apparatus having the above-mentioned arrangement, two sides of a polygon on a display plane and two sides of a polygon on a texture plane are synchronously linearly interpolated and the line segments thus obtained likewise are linearly interpolated in synchronism. The linear interpolation data for the line segment on the texture plane are supplied to the mapping memory 141. The mapping memory 141 reads out data in which corrections for shading or the like have been made. By projecting these data on the display plane, the texture original figure can be mapped. This mapping is achieved at a speed of about 2,500 polygons/second where one polygon is defined as a regular square of 20 dots (i.e. pixels)×20 dots whose sides are inclined with respect to the scan line at any arbitrary angle. In the texture mapping apparatus having the above-mentioned arrangement, if even one of the figures on the display plane and on the texture plane undergoes a change, it is required to accordingly carry out linear interpolation, and writing and reading of the liner interpolation data to and from the mapping memory. This not only increases the number of linear interpolation operations, but also the number of data to be written to or read from the mapping memory. This would not achieve texture mapping processing at a speed exceeding 2,500 polygons/second.

Further, it is most unlikely mapping processing of an animation image could be executed in real time at a texture mapping processing speed at 2,500 polygons/second. It is also not possible to deform a 3D figure in which a texture is to be mapped, by rotation, zooming, scaling and the like. Indeed, the use of this texture mapping apparatus is limited to texture mapping processing for a stationary image only.

SUMMARY OF THE INVENTION

It is an object of the present invention to provide a texture mapping apparatus and method capable of executing texture mapping processing at considerably high speed.

It is another object of the present invention to provide a texture mapping apparatus and method capable of achieving, in real time, texture mapping processing in which an animated image is used as a texture original figure.

It is a further object of the present invention to provide a texture mapping apparatus and method capable of executing texture mapping processing merely by calculating 2D source coordinates data for texture mapping data and reading the corresponding pixel image data out of the texture data.

It is still another object of the present invention to provide a texture mapping apparatus and method capable of executing texture mapping processing with hidden surface removal.

It is a still further object of the present invention to provide a texture mapping apparatus and method capable of executing texture mapping processing with a desired texture selected from a plurality of textures.

It is yet another object of the present invention to provide a texture mapping apparatus and method capable of executing shading processing according to the color index method together with texture mapping processing.

In order to achieve the above-mentioned objects, the texture mapping apparatus in accordance with the present invention comprises texture data storing means, input control means, display means, mapping address generating means, mapping address storing means and display control means.

The texture data storing means is adapted to store pixel image data to be mapped. The pixel image data represent a texture and include data of a variety of preset colors and data which are externally supplied.

The input control means is adapted to supply 2D source coordinates data for (providing the source of) texture mapping data to the texture data storing means, thereby to designate the storing addresses of the pixel image data defining the texture.

The display means is adapted to receive the pixel image data read out from the texture data storing means, thereby to visually display a figure in which a texture mapping processing has been executed.

The mapping address generating means is adapted to receive drawing command data to thereby generate 3D destination coordinates data for (providing the destination of) texture mapping data and 2D source coordinates data for texture mapping data corresponding thereto.

The mapping address storing means is adapted to store the 2D source coordinates data for texture mapping data corresponding to the 3D destination coordinates data for texture mapping data, and to supply, to the texture data storing means, the 2D source coordinates data for texture mapping data stored at locations defined by the designated 3D destination coordinates data for texture mapping data, as pixel image data reading addresses.

The display control means is adapted to supply the 3D destination coordinates data for texture mapping data corresponding to the addresses of display areas of the display means, to the mapping address storing means.

In accordance with the texture mapping apparatus having the above mentioned arrangement, the mapping address generating means receives drawing command data to generate 3D destination coordinates data for texture mapping data and 2D source coordinates data for texture mapping data corresponding thereto, and the mapping address storing means stores the 2D source coordinates data for texture mapping data thus generated.

More specifically, coordinates data of the texture plane are generated corresponding to the display plane area on which a texture is to be mapped, these 2D source coordinates for texture mapping data constituting the storing address data of the designated pixel image data which are present in an area for storing the pixel image data constituting the texture. There are also generated coordinates data of the texture plane area corresponding to areas on the display plane where the texture is not to be mapped, these 2D source coordinates data for texture mapping data providing the storing address data of the designated color data which are present in an area for storing the pixel image data of a variety of preset colors.

Then, the input control means supplies the 2D source coordinates data for texture mapping data to the texture data storing means in its area for storing pixel image data constituting the texture to thereby designate the storing address data. The texture data storing means then stores pixel image data constituting the texture.

When the display control means supplies, to the mapping address storing means, 3D destination coordinates data for texture mapping data corresponding to the addresses of display areas of the display means, the mapping address storing means reads out the 2D source coordinates data for texture mapping data with the 3D destination coordinates data for texture mapping data serving as the reading addresses. Since the 2D source coordinates data for texture mapping data which have been read out are supplied as the pixel image data reading addresses to the texture data storing means, the texture data storing means reads out and supplies to the display means, pixel image data which has been stored at the texture plane coordinates. Thus, the display means can visually display a figure for which texture mapping processing has been executed.

More specifically, when not only the address data for the pixel image data of a variety of preset colors, but also the address data for a figure in which texture mapping processing is to be executed, are stored in the mapping address storing means, the figure for which texture mapping processing has been executed can be displayed by merely reading out the pixel image data of a variety of preset colors, as well as the texture data to be mapped. That is, it is merely required to read out the texture data to be mapped without any operation made thereof. This enables texture mapping processing to be executed at a considerably high speed.

If the address data for figures subjected to texture mapping processing does not change, it is sufficient to calculate such address data by one operation only. If such address data vary, it still is not required to greatly increase the variation speed of the address data as compared with the variation speed of the texture data to be mapped. Accordingly, texture mapping processing wherein the address data varies, also can be executed at high speed as compared with conventional apparatus.

Other objects, advantages and novel characteristics of the present invention will be apparent from the following description.

BRIEF DESCRIPTION OF THE ATTACHED DRAWINGS

FIG. 1 is a block diagram of a texture mapping apparatus in accordance with a first embodiment of the present invention;

FIGS. 2A through E are diagrams useful in understanding texture mapping processing;

FIGS. 10 to 13 are diagrams useful in understanding mapping address generating operations; and FIG. 14 is a block diagram of a conventional texture mapping apparatus proposed by the inventor.

DETAILED DESCRIPTION OF THE PREFERRED EMBODIMENTS

Figure 1:
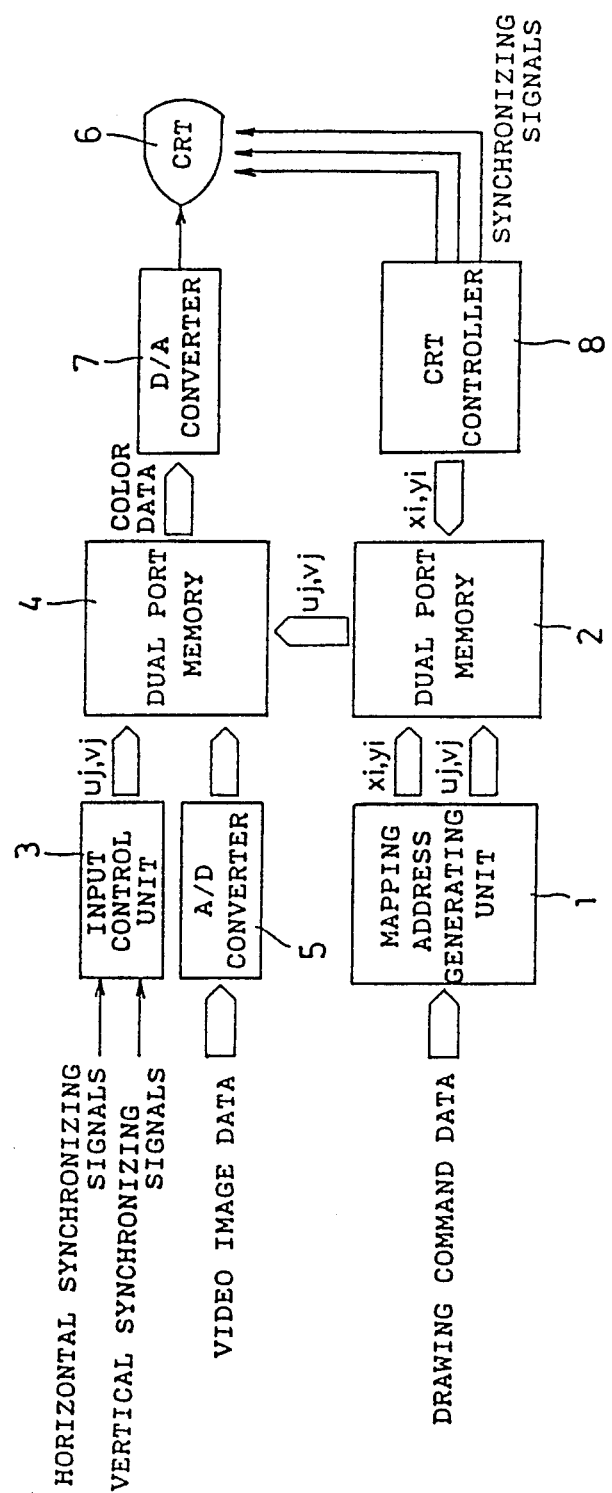

FIG. 1 is a block diagram of a texture mapping apparatus in accordance with a first embodiment of the present invention. The texture mapping apparatus in FIG. 1 comprises:

a mapping address generating unit 1 for receiving drawing command data from a host processor (not shown) to generate 3D destination coordinates data for (providing the destination of) texture mapping data and 2D source coordinates data for (providing the source of) texture mapping data corresponding thereto;

a mapping address dual port memory 2 for storing the 2D source coordinates data for texture mapping data with the 3D destination coordinates data for texture mapping data serving as the writing address data, and for reading the 2D source coordinates data for texture mapping data corresponding to the designated 3D destination coordinates data for texture mapping data;

an input control unit 3 for receiving horizontal and vertical synchronizing signals to generate the 2D source coordinates data for texture mapping data uj, vj, where "j" is a random integer;

a texture data storing dual port memory 4 for storing video image data corresponding to the 2D source coordinates data for texture mapping data uj, vj generated by the input control unit 3, and for reading the data stored therein with the 2D source coordinates data for texture mapping data from the dual port memory 2 serving as reading designation address data, the video image data being stored after conversion to digital data by an analogue/digital converter 5 (hereinafter referred to as the A/D converter 5);

a CRT 6 for receiving the data read out from the dual port memory 4 after conversion of such data to analogue data by a digital/analogue converter 7 (hereinafter referred to as the D/A converter 7), and for visually displaying a figure for which texture mapping processing has been executed; and a CRT controller 8 for generating 3D destination coordinates data for texture mapping data xi, vi where "i" is a random integer, corresponding to synchronizing signals supplied to the CRT 6, and for supplying the 3D destination coordinates data for texture mapping data thus generated as reading designation address data to the dual port memory 2.

The A/D converter 5 may be omitted if the video image data is already digitized when supplied to the memory 4. In the dual port memory 2, data are written in random access and data are read in sequential access, whereas in the dual port memory 4, data are written in sequential access and data are read in random access. The dual port memory 2 stores the 2D source coordinates data for texture mapping data, while the dual port memory 4 stores color data for all pixels of the video image data.

The following description will discuss in detail the operation of the texture mapping apparatus having the above mentioned arrangement with reference to FIG. 2.

The host processor supplies drawing command data to the mapping address generating unit 1, thereby to generate 3D destination coordinates data for texture mapping data xi, vi and 2D source coordinates data for texture mapping data uj, vj corresponding thereto. The 2D source coordinates data for texture mapping data uj, vj are then written into the dual port memory 2 which preferably comprises a random access memory. More specifically, the 2D source coordinates data for texture mapping data corresponding to a figure area R1 in which a video image is to be mapped (hereinafter referred to as the texture area R1) are generated, and then stored in the dual port memory 2, and the 2D source coordinates data for texture mapping data corresponding to a figure area R2 are also generated, and the stored in the dual port memory 2.

Figure 2A:
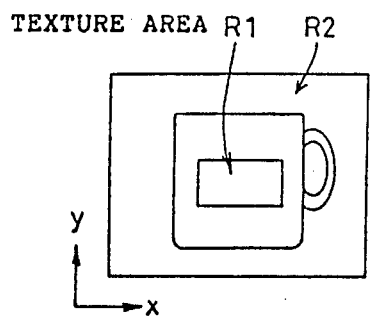
Figure 2B:
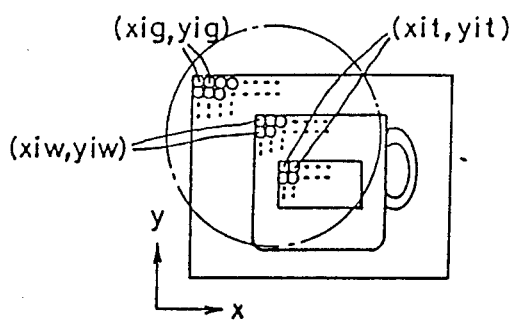
Figure 2C:
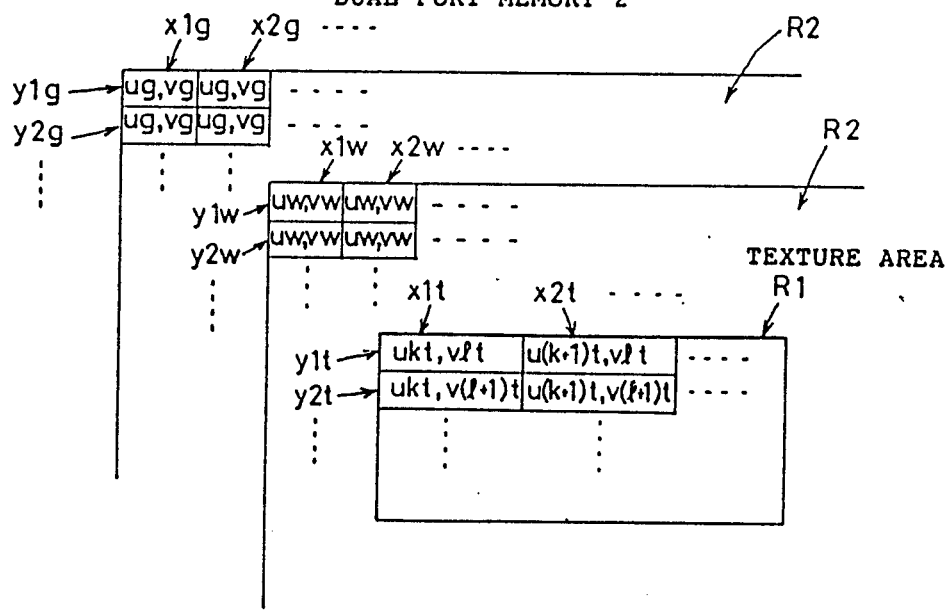
Figure 2D:
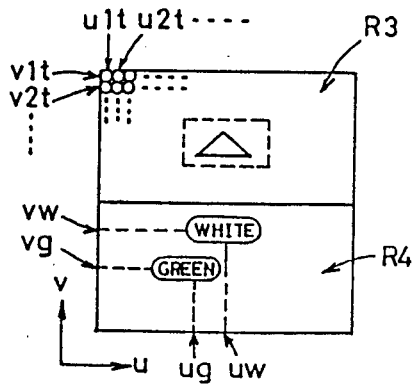
Figure 2E:
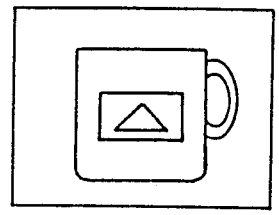

The drawing command data, represents both figure areas R1 and R2 and the shape of a figure, for example a cup, to be displayed on the figure area R2 and the color of this cup (for example white) and the background color (for example green) are also designated (See FIG. 2(A)).

Accordingly, generated in the mapping address generating unit 1 are 3D destination coordinates data for texture mapping data xiw, viw ("i" is a random integer) in the dual port memory 2 and 2D source coordinates data for texture mapping data uw, vw at which white pixel image data are stored, these xiw, yiw, uw, vw corresponding to the pixels in the white area. The 2D source coordinates data for texture mapping data uw, vw are stored in the dual port memory 2 at locations determined by the 3D destination coordinates data for texture mapping data xiw, yiw (See FIG. 2 (B) and FIG. 2 (C) in which the main portions in FIG. 2 (B) are enlarged). Also generated are 3D destination coordinates data for texture mapping data xig, yig ("i" is a random integer) and 2D source coordinates data for texture mapping data ug, vg at which green pixel image data are stored, these data xig, yig, ug, vg corresponding to green pixels in the green area. The 2D source coordinates data for texture mapping data ug, vg are stored in the dual port memory 2 at positions determined by the 3D destination coordinates data for texture mapping data xig, yig (See FIG. 2 (B) and FIG. 2 (C) in which main portions in FIG. 2 (B) are enlarged). Further generated are 3D destination coordinates data for texture mapping data xit, vit ("i" is a random integer) and 2D source coordinates data for texture mapping data uit, vit ("i" is a random integer) of the pixel image data constituting the texture, these data xit, yit, uit, vit corresponding to the pixels in the figure area R1. The 2D source coordinates data for texture mapping data uit, vit are stored in the dual port memory 2 at positions determined by the 3D destination coordinates data for texture mapping data xit, yit (See FIG. 2 (B) and FIG. 2 (C) in which the main portions in FIG. 2 (B) are enlarged).

From the foregoing, it is noted that the 3D destination coordinates data for texture mapping data have different values for all pixels, but the 2D source coordinates data for texture mapping data uw, vw to be stored in the white area have the same values and the 2D coordinates data of source for texture mapping data ug, vg to be stored in the green area also have the same values. The 2D source coordinates data for texture mapping data uit, vit to be stored in the figure area R1 have different values.

Texture plane coordinates data uj, vj are generated in the input control unit 3 to which horizontal and vertical synchronizing signals are supplied. These data uj, vj are supplied to the dual port memory 4 as data storing designation addresses. Accordingly, the video image data digitized by the A/D converter 5 are successively written based on the data storing designation addresses above-mentioned (See FIG. 2(D)). As shown in FIG. 2 (D), however, the dual port memory 4 has an area R3 in which the video image data are written, and an area R4 in which a variety of color data which can be displayed, are previously written. Only the color data of the area R3 are changed by the video image data.

Accordingly, when visually displaying the figure by supplying synchronizing signals from the CRT controller 8 to the CRT 6, the CRT controller 8 supplies, as reading designation addresses, 3D destination coordinates data for texture mapping data xi, yi corresponding to the synchronizing signals, to the dual port memory 2. The previously stored 2D source coordinates data for texture mapping data uj, vj are then read out and supplied, as reading designation addresses, to the dual port memory 4. The dual port memory 4 then reads out the pixel image data, i.e., color data, at the designated addresses uj, vj. After digital to analog conversion by the D/A converter 7, the pixel image data are supplied to the CRT 6. It is thus possible to visually display the figure in which the video image has been mapped, as shown in FIG. 2 (E).

As apparent from the foregoing, it is the mapping address generating unit 1 only that carries out interpolation operations and the like, based on drawing command data supplied from the host processor. Further, when the figure on which a video image is to be mapped, undergoes no change, it is merely required to store the mapping address data obtained by one necessary operation, in the dual port memory 2 and to read out the color data written in the dual port memory 4 in sequential access with the 2D source coordinates data for texture mapping data serving as reading address data. Accordingly, the time required is attributed mainly to the writing time and the reading time. This enables considerably increased texture mapping processing speed so that a video image varying at a considerably high speed can be mapped on the texture area without inconvenience.

When the figure on which a video image is to be mapped undergoes a change, for example when the figure is moved, zoomed or scaled, it is merely required to carry out a necessary operation in the mapping address generating unit 1 to generate new 2D source coordinates data for texture mapping data, which data are then written in the dual port memory 2. Accordingly, the video image can be mapped on a 3D animation figure and the processing time required for such mapping can be reduced.

In the foregoing, the operation in which a video image is mapped has been described. However, a similar texture mapping operation can be executed for an image provided by a camera or the like, and for an animation or stationary image.

Figure 3:
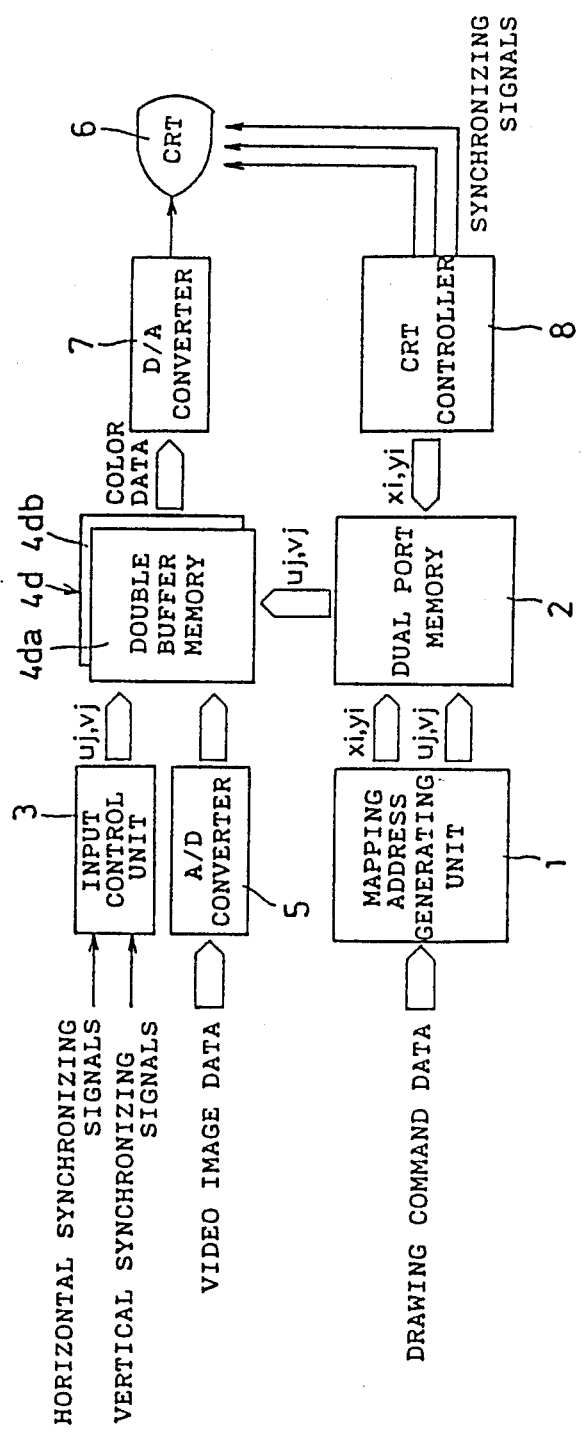
FIG. 3 is a block diagram of a texture mapping apparatus in accordance with a second embodiment of the present invention.

FIG. 3 is a block diagram of a texture mapping apparatus in accordance with a second embodiment of the present invention. The second embodiment is different from the first embodiment in the following point only.

A double buffer memory 4d is provided instead of the dual port memory 4 in the embodiment of FIG. 1.

In accordance with the second embodiment, while video image data converted into digital data by an A/D converter 5 are written into one buffer memory 4da of the double buffer memory 4d, 2D source coordinates data for texture mapping data uj, vj read out from a dual port memory 2 are supplied to the other buffer memory 4db and the pixel image data, i.e., color data of the portion concerned are read out. Thus, the figure in which the video image has been mapped can be presented for visual display on a CRT 6.

Figure 4:
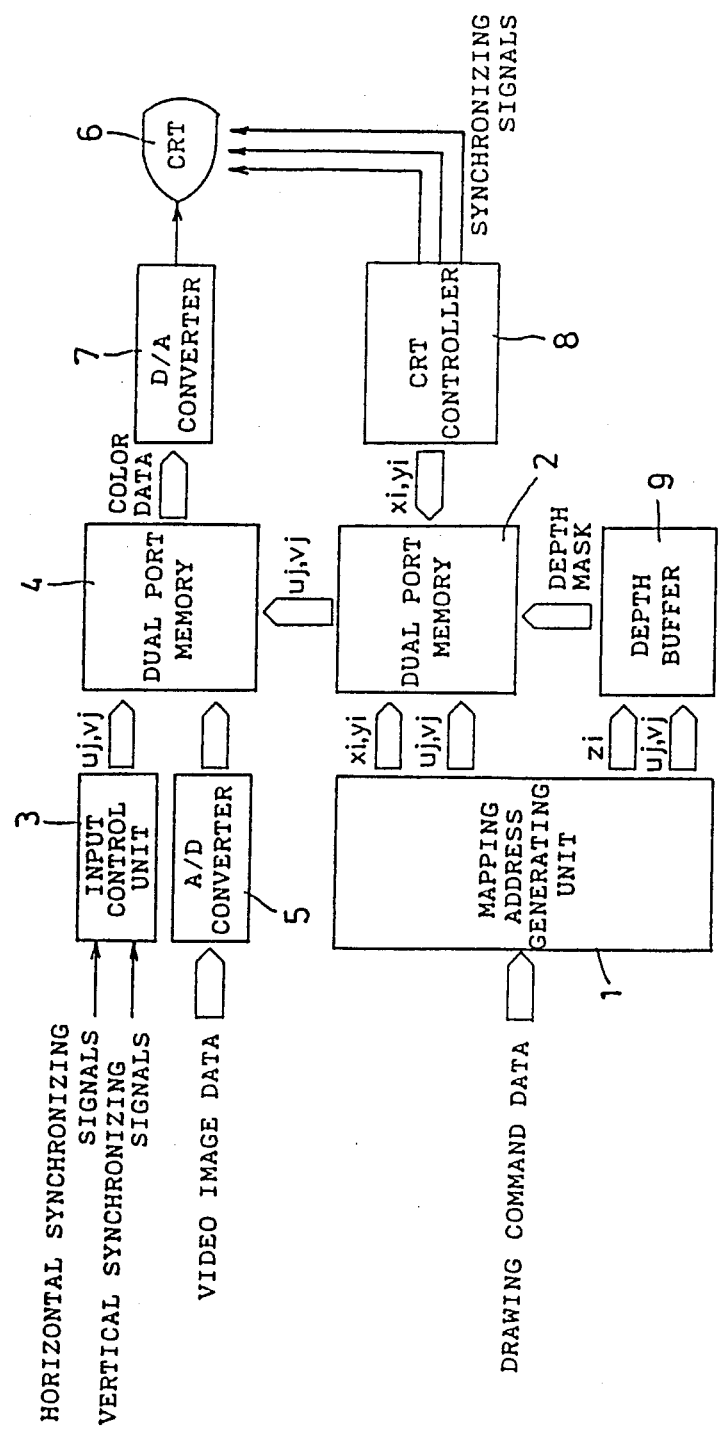
FIG. 4 is a block diagram of a texture mapping apparatus in accordance with a third embodiment of the present invention.

FIG. 4 is a block diagram of a texture mapping apparatus in accordance with a third embodiment of the present invention. The third embodiment is different from the first embodiment in the following points only.

That is, a mapping address generating unit 1 generates 3D destination coordinates data for texture mapping data xi, vi, depth-directional coordinates data zi ("i" is a random integer), and 2D source coordinates data for texture mapping data uj, vj, and a depth buffer 9 for hidden surface removal receives the data thus generated and supplies a depth mask to a dual port memory 2.

In accordance with the third embodiment, even though drawing command data are supplied for designating to draw the data of a figure in the texture area for which hidden surface removal has not been made, only the 2D coordinates data of source for texture mapping data of, for example, the frontmost side can be written in the dual port memory 2 by the depth mask supplied by the depth buffer 9. The 2D source coordinates data for texture mapping data uj, vj stored in the dual port memory 2 are those in which hidden surface removal has been made. Accordingly, an animation or stationary image can be mapped on the texture area in which hidden surface removal has been made.

Figure 5:
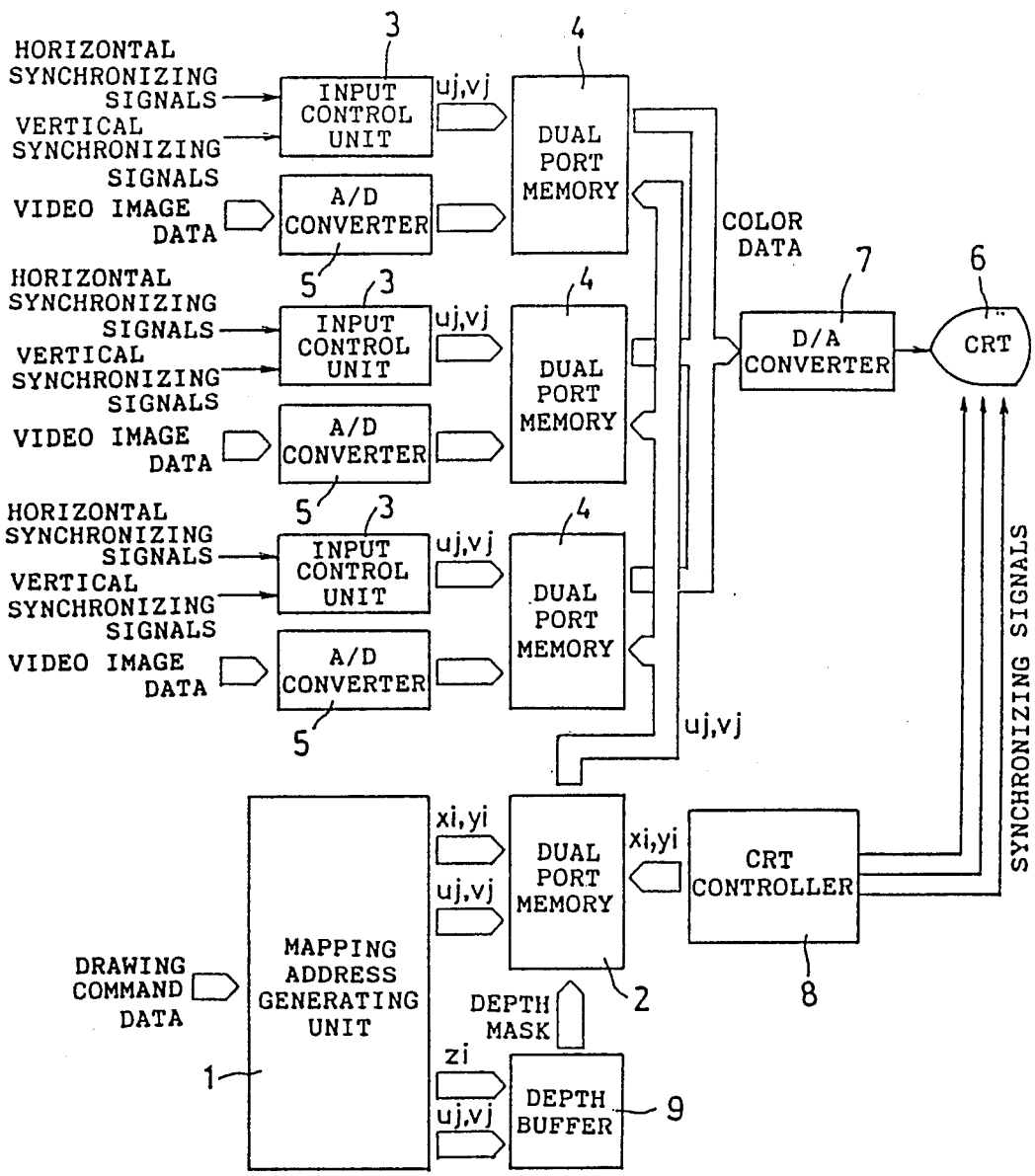
FIG. 5 is a block diagram of a texture mapping apparatus in accordance with a fourth embodiment of the present invention.
Figure 6A:
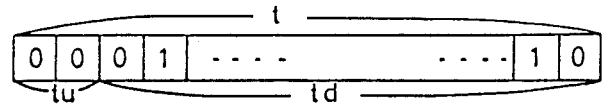
FIG. 6 is a diagram useful in understanding the relationship between 2D source coordinates data for texture mapping data and dual port memory selection data.
Figure 6B:
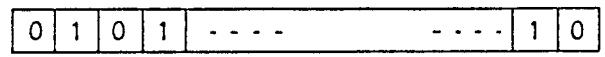
Figure 6C:
Figure 6D:
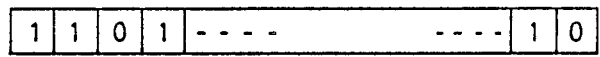
Figure 7:
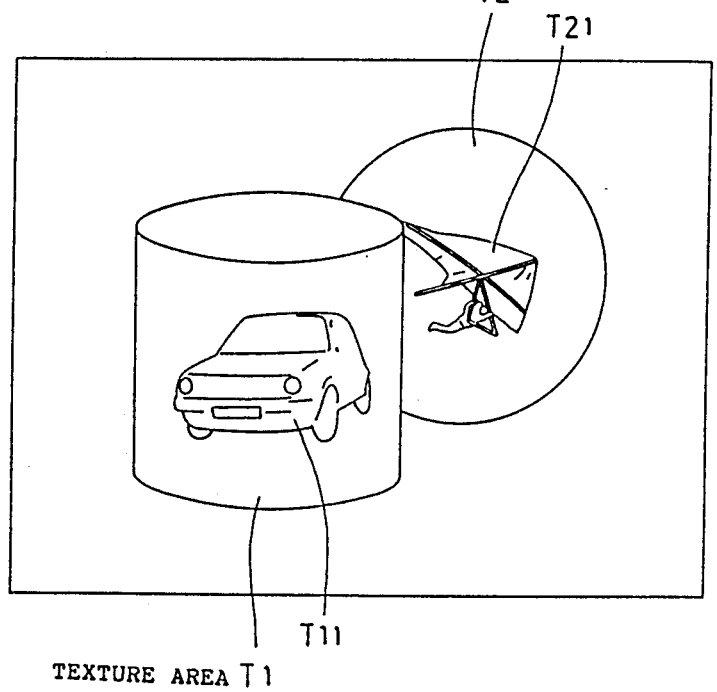
FIG. 7 is a diagram useful in understanding texture mapping processing executed according to the fourth embodiment of the present invention shown in FIG. 5.

FIG. 5 is a block diagram of the texture mapping apparatus in accordance with a fourth embodiment of the present invention. The fourth embodiment is different from the third embodiment in the following points only.

Three input control units 3, three A/D converters 5 and three dual port memories 4 are respectively disposed in parallel as shown in FIG. 5, and two upper bits tu of the 2D source coordinates data for texture mapping data t to be stored in a dual port memory 2 are used as dual port memory selection data (see FIG. 6). Since the dual port memory selection data have two bits, maximum four dual port memories 4 can be used selectively as shown in FIGS. 6 (A) and (D). When the number of dual port memories 4 to be selected is increased, it is merely required to increase the number of bits of the dual port memory selection data.

In accordance with the fourth embodiment, different animation images can be respectively stored in the dual port memories 4, and the bits tu respectively representing the dual port memories 4 to be selected, can be respectively given to the 2D source coordinates data for texture mapping data stored in a dual port memory 2. Thus, different animation images can be respectively mapped on a texture area at different desired portions thereof.

More specifically, it is now supposed that the texture area is in the form of a circular cylinder T1 on which an image of motor car T11 is to be mapped, and a sphere T2 on which an image of hang glider T21 is to be mapped. Since hidden surface removal has been made for the circular cylinder T1 and the sphere T2, only the 2D source coordinates data for texture mapping data of the circular cylinder or the sphere for the pixels having the same 3D destination coordinates data for texture mapping data, are stored in the dual port memory 2. Then, the 2D source coordinates data for texture mapping data t of the figures of which hidden surfaces have been removed, are read out from the dual port memory 2, and the bits td other than the upper two bits tu are read and supplied, as reading designation address data uj, vj, to the dual port memory 4 designated by the upper two bits tu. Thus, the figures in which predetermined animation images have been respectively mapped, can be presented for visual display on the CRT 6.

Figure 8:
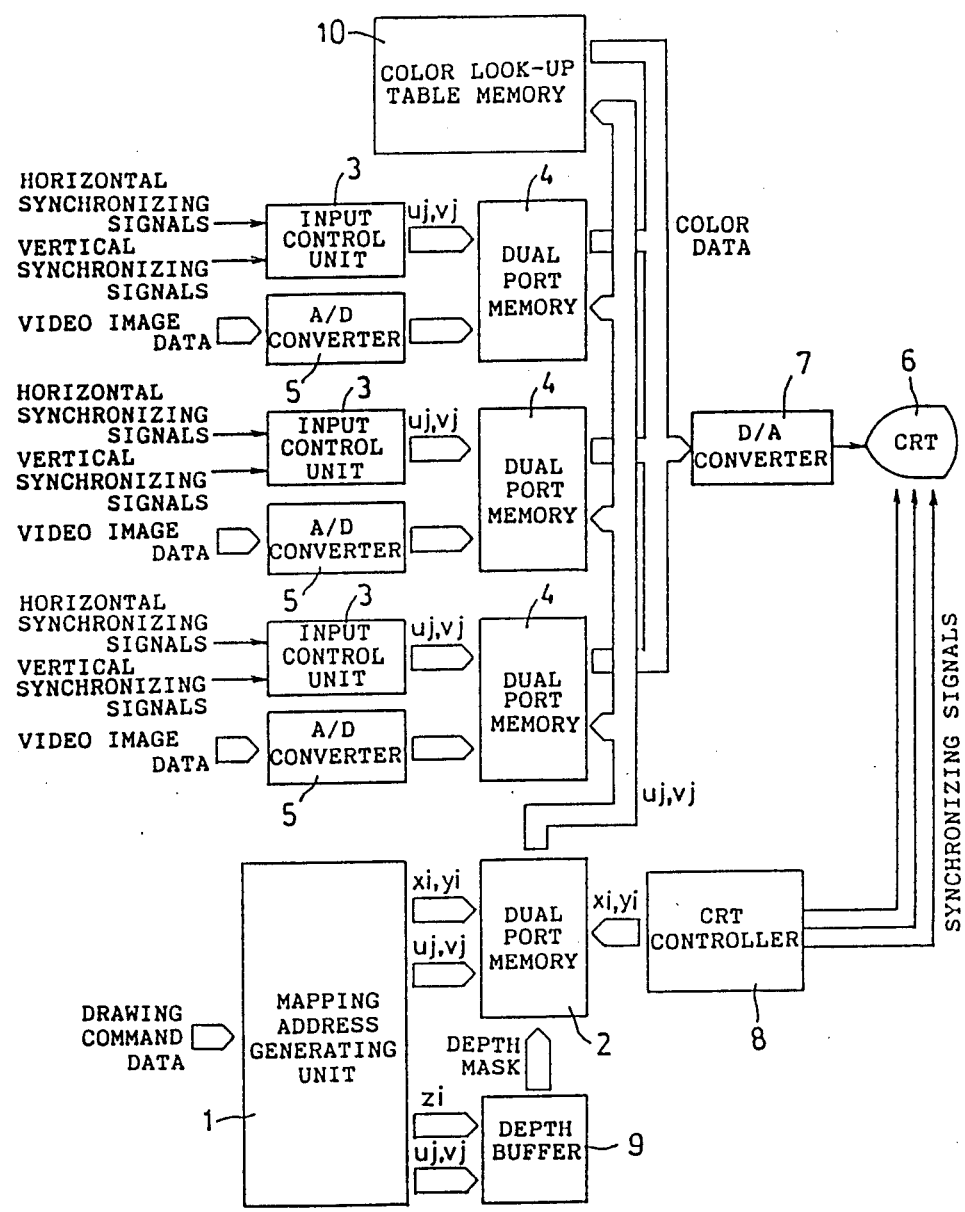
FIG. 8 is a block diagram of a texture mapping apparatus in accordance with a fifth embodiment of the present invention.

FIG. 8 is a block diagram of the texture mapping apparatus in accordance with the fifth embodiment of the present invention. The fifth embodiment is different from the fourth embodiment in the following points only.

A color look-up table memory 10 is provided and 2D source coordinates data for texture mapping data are assigned therein.

In accordance with the fifth embodiment, the contents of the color look-up table memory 10 can be read out based on the 2D source coordinates data for texture mapping data uj, vj. This enables execution of shading processing according to the color index method so that an edge display can be made at the boundary of a figure on which an animation image is to be mapped.

Figure 9:
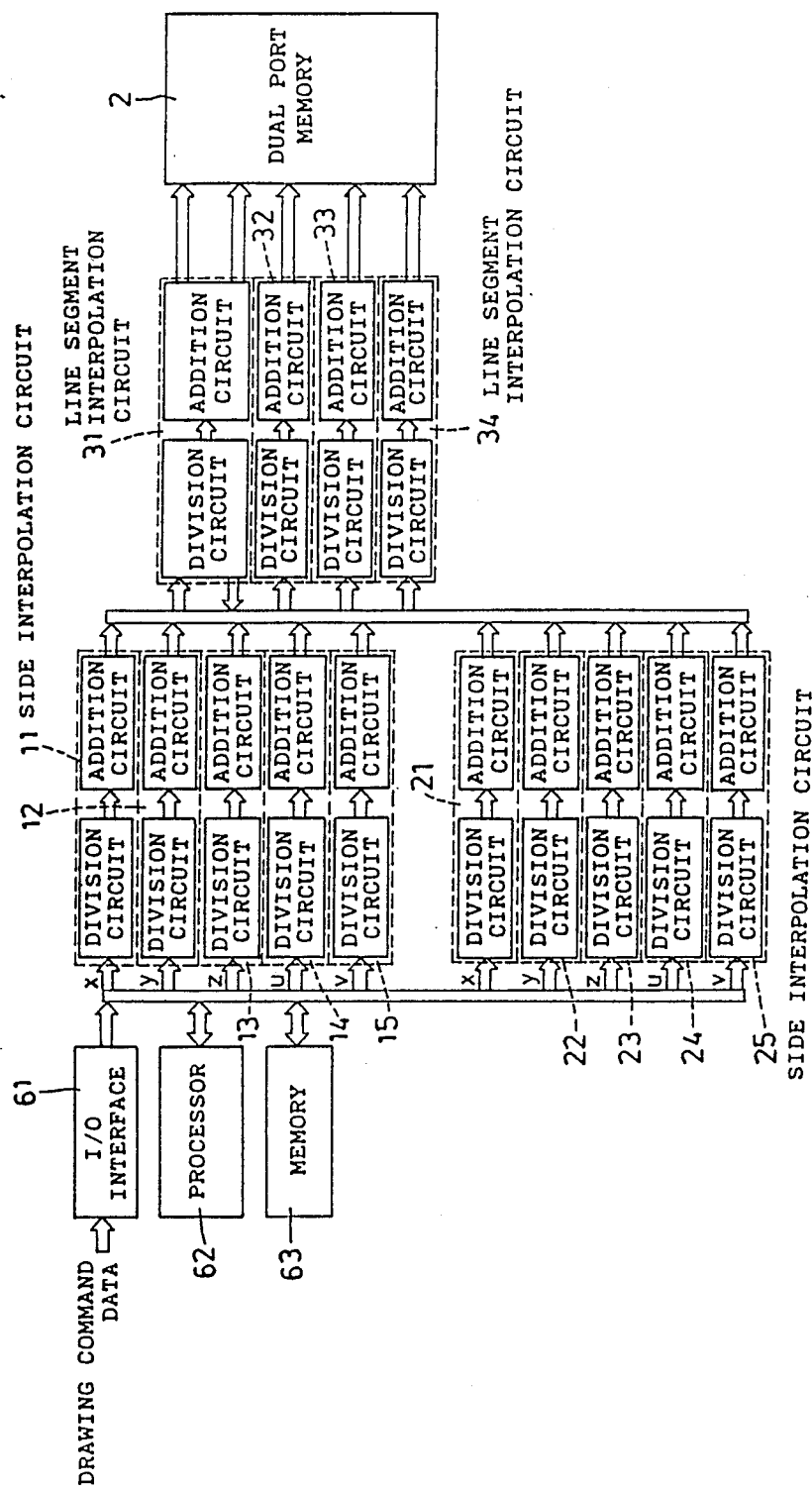
FIG. 9 is a block diagram illustrating an exemplary mapping address generating unit.

FIG. 9 is a block diagram showing an exemplary mapping address generating unit 1, which comprises:

side interpolation circuits 11 to 15 and 21 to 25 for x-, y-, and z-values which are three dimensional coordinates data representing two sides on the display plane and u- and v-values which are two dimensional coordinates data representing two sides on the texture plane;

a line segment interpolation circuit 31 for receiving the x- and y-values supplied from the side interpolation circuits 11, 12, 21, 22;

line segment interpolation circuits 32, 33, 34 for receiving the z-, u- and v-values supplied from the side interpolation circuits 13, 14, 15, 23, 24, 25;

an I/O interface 61 for fetching drawing command data;

a processor 62 for executing a side selection processing and the like; and a memory 63.

Each of the side interpolation circuits includes a division circuit and an addition circuit for cumulatively adding the division result. Each of the line segment interpolation circuits likewise includes a division and an addition circuit. Accordingly, the respective interpolation operations can be executed simultaneously.

The processor 62 is adapted to select, based on apex data sent from a host processor (not shown), two sides for which side interpolation is to be carried out. This processor 62 is also adapted to supply x-, y- and z-data supplied from the line segment interpolation circuits 31, 32, to a dual port memory 2.

The following description will discuss the operation of the texture mapping generating unit 1 having the abovementioned arrangement.

The processor 62 selects, out of a plurality of apex data transmitted thereto, apex data which correspond to the starting and terminal points of two sides for which side interpolation is to be carried out. A pair of apex data for each side are supplied to the side interpolation circuits 11 to 13 and the side interpolation circuits 21 to 23. Those apex data of a figure on the texture plane which correspond to the apex data, are also selected. The pairs of apex data representative of the side for which sides interpolation is to be carried out are supplied to the side interpolation circuits 14, 15 and the side interpolation circuits 24, 25 respectively. Based on the length of a side determined by a pair of apex data, division number data are calculated to carry out side interpolation. Such division number data can be calculated, for example, as a numeral in which 1 is added to the sum of the number of pixels in the x direction between two apexes and the number of pixels in the y direction between the same two apexes. The division number data thus calculated are supplied to the side interpolation circuits 11 to 15 and the side interpolation circuits 21 to 25.

In each of the side interpolation circuits into which both data have been entered as above-mentioned, the side length, given by the difference between the two values corresponding to both apexes, is divided by the division number data. Each quotient is successively accumulated to the data of one apex to obtain side interpolation data, which side interpolation data are then supplied to an associated line segment interpolation circuit.

In the line segment interpolation circuit 31, based on a pair of side interpolation data, there is calculated the length of a line segment, based on which there are calculated division number data with which line segment interpolation is to be carried out. Such division number data can be calculated, for example, by comparing the number of pixels in the x direction and the number of pixels in the y direction between two points and selecting the larger one as the division number. The difference between the starting and terminal points in the direction of each coordinates axis is divided by the division number data. By cumulatively adding each quotient successively to data of one end point, line segment interpolation data are obtained. The data thus obtained are supplied to the dual port memory 2.

In the remaining line segment interpolation circuit, a difference between the values corresponding to the end points is divided by the division number data calculated in the line segment interpolation circuit 31. By cumulatively adding each quotient successively to the data of one end point, line segment interpolation data are obtained. Line segment interpolation data from the line segment interpolation circuit 32 and line segment interpolation data from the line segment interpolation circuits 33, 34 are supplied to the dual port memory 2 as z-values and u- & v-values, respectively.

That is, the line segment interpolation circuits 33, 24 generate the 2D source coordinates data for texture mapping data u, v which correspond to the coordinates of pixels on the display plane obtained by the line segment interpolation circuits 31, 32, and the data u, v are written in the dual port memory 2.

As apparent from the foregoing, two sides are linearly interpolated and the line segments obtained are linearly interpolated so that the texture original figure matches with the figure on the display plane. Accordingly, even though the mapping area on the display plane presents a butterfly plane, the texture original figure can be mapped properly.

As also apparent from the foregoing, it is possible that many portions of a figure are to be drawn as overlapped on the texture plane. In the linear interpolation operation, however, only simple cumulative additions are required after one division has been carried out. Therefore, by arranging the interpolation circuits in hardware, the entire processing time can be shortened, as compared with a conventional method in which matrix conversion is carried out for each pixel.

Figure 10:
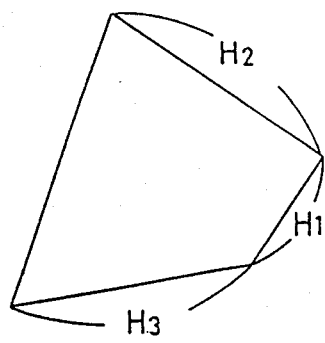

FIG. 10 is a view illustrating the operation of the mapping address generating unit 1.

When x- and y-coordinates of four apexes on the display plane are given (for three apexes, the same operation also can be carried out, but the detailed description thereof is omitted), the shortest side H1 is obtained. For example, the lengths of the sides can be compared based on values obtained by adding the difference between the x-coordinate values of two apexes of each side, to the different between the y-coordinate values of these two apexes. The side having such value which is the smallest, is defined as the shortest side. Then, the sides H2 and H3 adjacent to this shortest side are selected as two sides. Also, two sides on the texture plane corresponding to first-mentioned two sides on the display plane, are selected.

Figure 11A:
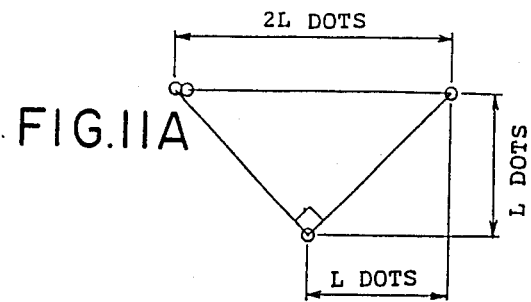
Figure 11B:
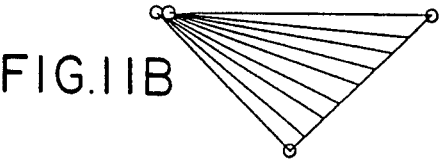
Figure 11C:
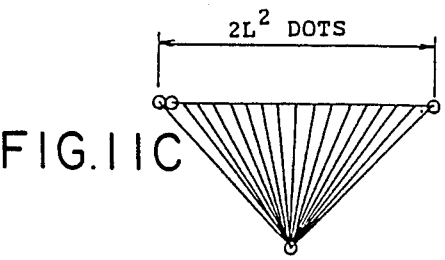

By selecting two sides in the manner above-mentioned, the number of pixels to be drawn can be reduced. More specifically, there is now given an example in which a figure has a data structure of a quadrilateral, but has a shape which can be approximated to a right-angled equilateral triangle, in which the longest side has 2L dots, i.e. pixels, and the distance between the longest side and the apex most remote therefrom is L dots, as shown in FIG. 11 (A). When the shortest side and the side opposite thereto are selected, the figure is divided into 2L line segments, as shown in FIG. 11 (B). When the two other sides are selected, the figure is also divided into 2L line segments as shown in FIG. 11 (C). In the case of FIG. 11 (B), however, each of the 2L line segments has a length in a range from L to 2L dots and the number of dots to be drawn is $3L^2$, whereas in the case of FIG. 11 (C), each of the line segments has a length of L dots and the number of dots to be drawn is $2L^2$. Accordingly, the number of dots to be drawn is reduced by $L^2$ in the case of FIG. 11 (C).

A division number to be used for the linear interpolation is determined based on the two sides selected in the above-mentioned manner.

Such a division number will be determined in the following manner.

When two sides are selected as shown in FIG. 12 (A), there are calculated the number of dots in the x direction $\Delta x1$, $\Delta x2$ and the number of dots in the y direction $\Delta y1$, $\Delta y2$ which exist between the end points of each side. Then, the numbers of dots of each of the sides are compared. That is the values $|\Delta x1| + |\Delta y1| + 1$, and $|\Delta x2| + |\Delta y2| + 1$ are compared with each other. The larger value is selected as a division number for linear interpolation.

When the division number is selected, all pixels through which the longer side passes are end points of line segments to be divided as shown in FIG. 12 (B), while all pixels through which the shorter side passes are end points of one or more line segments to be divided as shown in FIG. 12 (C). Accordingly, none of the line segments produced by the division operation are separated from one another by more than one pixel. This reliably ensures that all pixels are mapped.

The division number obtained in the manner above-mentioned is also used as the division number for linear interpolation of the corresponding two sides on the texture plane. Therefore, it is possible that portions of line segments produced by dividing a figure could be separated from each other by two or more pixels depending on the size of a texture original figure. However, this does not cause any particular inconvenience since it is a figure on the display plane that is finally displayed in a visual manner.

After two opposite sides have been linearly interpolated in the above-mentioned manner, the line segments determined based on the linear interpolation data are linearly interpolated.

In such case, a division number is calculated based on the length of a line segment on the display plane, and based on the division number thus calculated, the line segments on the display plane and on the texture plane are linearly interpolated.

Accordingly, pixel data on the display plane obtained by linear interpolation do not miss any dots. On the other hand, pixel data on the texture plane obtained by linear interpolation might omit dots, depending on the lengths of the line segments. However, this does not cause any particular inconvenience because it is only the pixels on the display plane obtained by linear interpolation that are visually displayed.

However, a figure such as a straight line is disadvantageously displayed as a broken line. To overcome such inconvenience, pixels in a predetermined range around each pixel obtained by linear interpolation are subjected to a smoothing operation before being projected on the display plane.

In the third through fifth embodiments, a double buffer can be used instead of the dual port memory 4. Further, if decreases in texture mapping processing speed are permissible, memories different from the memories used in the embodiments above-mentioned may be used as the mapping address storing memory and the texture data storing memory, as far as such memories are able to read and write data. Moreover, a mapping address generating unit, arranged such that a major portion of the processing is executed by the processor, may be used. A display device other than the CRT 6 also may be used.

What is claimed is:

1. A texture mapping apparatus comprising:
   texture data storing means for storing pixel image data to be mapped;
   input control means for supplying first 2D source coordinates data for providing a source of texture mapping data to said texture data storing means to designate the storing addresses of said pixel image data;
   display means for visually displaying a figure based on pixel image data read out from said texture data storing means;
   mapping address generating means for receiving drawing command data and generating second 2D source coordinates data for providing a source of texture mapping data corresponding to 3D destination coordinates data for providing a destination for the texture mapping data;

mapping address storing means for storing said second 2D source coordinates data generated by said mapping address generating means, for reading said second 2D source coordinates data which correspond to the designated 3D destination coordinates data, said 3D destination coordinate data being supplied from a display control means, and for supplying said second 2D source coordinates data as pixel image data reading addresses to said texture data storing means; and display control means for generating said 3D destination coordinates data corresponding to addresses of display areas of said display means, and for supplying said 3D destination coordinates data as reading addresses to said mapping address storing means.

2. A texture mapping apparatus as set forth in claim 1, wherein said texture data storing means has an area for storing the pixel image data to be mapped, and an area for storing data representative of a plurality of preset colors.

3. A texture mapping apparatus as set forth in claim 1, wherein the texture data storing means stores the pixel image data in sequence for each scan line based upon said first 2D source coordinates data supplied from said input control means, and reads said pixel image data at random based on said second 2D source coordinates data supplied from the mapping address storing means.

4. A texture mapping apparatus as set forth in claim 3, wherein the texture data storing means comprises either a dual port memory or a double buffer memory.

5. A texture mapping apparatus as set forth in claim 1, wherein the mapping address storing means stores said second 2D source coordinates data corresponding to said 3D destination coordinates data at random, and reads said second 2D source coordinates data in sequence based on said 3D destination coordinates data.

6. A texture mapping apparatus as set forth in claim 5, wherein the mapping address storing means is a dual port memory.

7. A texture mapping apparatus as set forth in claim 1, wherein the mapping address generating means generates depth data corresponding to said 3D destination coordinates data, and also generates said second 2D source coordinates data in which hidden surface removal has been made based on said depth data.

8. A texture mapping apparatus as set forth in claim 1, wherein the pixel image data to be mapped is that of an animation image.

9. A texture mapping apparatus as set forth in claim 1, wherein a plurality of pairs of texture data storing means and a plurality of pairs of input control means are disposed, and the mapping address generating means also generates and then stores into the mapping address storing means, selection data for selecting the texture data storing means from which the pixel image data is read out.

10. A texture mapping method comprising the steps of:
(a) generating, gased on drawing command data, 3D destination coordinates data for providing destinations for texture mapping data and 2D source coordinates date for providing a source of texture mapping data, said 2D source coordinates data corresponding to said 3D destination coordinates data;
(b) storing said 2D source coordinates data corresponding to said 3D destination coordinates data in a mapping address storing means, said 3D destination coordinates data serving as writing addresses for said mapping address storing means;
(c) storing texture data into a texture data storing means at a location other than a predetermined location for storing a plurality of color data to be displayed; and
(d) successively reading said 2D source coordinates data from said mapping address storing means, and reading and visually displaying color data from locations in said texture data storing means, which locations are designated by said 2D source coordinates data;
when only said texture data vary,
(e) repeating said steps (c) and (d) for texture data which varies.

* * * * *